Figure 1:
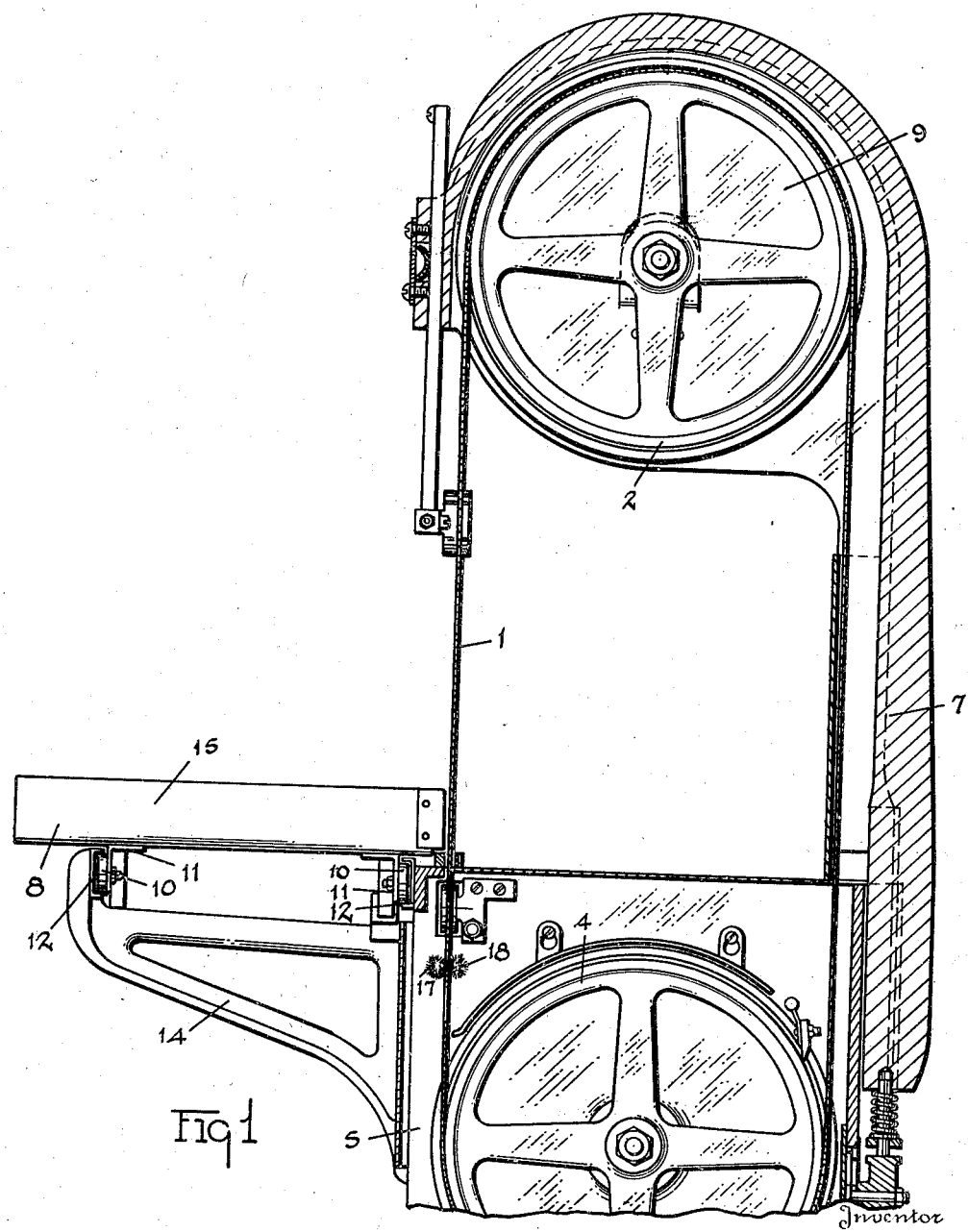

April 12, 1938. C. G. BIRO 2,113,931
MEAT CUTTING AND SLICING MACHINE
Original Filed Feb. 27, 1936 2 Sheets-Sheet 1

Inventor
Carl G. Biro
By
Attorney

April 12, 1938.  C. G. BIRO  2,113,931
MEAT CUTTING AND SLICING MACHINE
Original Filed Feb. 27, 1936  2 Sheets-Sheet 2

Inventor
Carl G. Biro
By
Attorney

Patented Apr. 12, 1938

2,113,931

UNITED STATES PATENT OFFICE 2,113,931

MEAT CUTTING AND SLICING MACHINE

Carl G. Biro, Marblehead, Ohio

Original application February 27, 1936, Serial No. 66,071. Divided and this application January 28, 1937, Serial No. 122,825

1 Claim. (Cl. 143—158)

My invention has for its object to provide means for efficiently removing from a band saw particles of materials that may adhere to the band saw. The invention is particularly advantageous in its application to band saw machines for meat cutting for the reason that the particles that are cut from the meat or, more particularly from the bone, form a hard glazed surface on the band saw and the wheels thus reducing the efficiency of the saw. Frequent removal of the band saw, therefore, becomes necessary in order to remove the material from the wheels that support the saw in order to prevent extreme slippage of the band saw with respect to the wheels.

In connection with band saw machines, scrapers of different kinds have heretofore been used for removing such portions of the particles that may lodge on the surfaces of the saw, but the scrapers do not remove the meat and bone particles that collect on the teeth of the saw which form the major portion of the particles that collect on the saw. The scrapers do not penetrate the spaces between the edges of the teeth, and they operate to pack the meat particles between the teeth of the saw. The particles are carried to the wheels where subsequent and similar deposits accumulate and spread over the surfaces of the wheels and the side surfaces of the saw and form a hardened glazed surface. For purposes of sanitation and to prevent excess slippage of the band saw on the wheels, the machine must be disassembled and the band saw removed and cleaned, and the wheels which impel the motion of the saw must also be cleaned. Also, by reason of the slight shifting movement of the band saw with respect to the wheels caused by the pressure of the meat against the saw, the materials, originally conveyed to the wheels by the teeth, are spread over the portions of the surfaces of the wheels with which the band saw makes contact, and also over the lateral surfaces of the band saw. By my invention, I have provided means for removing particles of the meat and bone from between the teeth of the saw where the major portion of such materials collects and in the movement of the band saw is deposited on the wheels.

The invention particularly provides a means both for causing discharge of the particles of meat and bone from the teeth and directing them away from the body of the saw.

The invention may be contained in sawing machines that partake of different forms and may be varied in their details and still embody the invention. To illustrate a practical application of the invention, I have selected a meat cutting and slicing machine as an example of the various machines that contain the invention and shall describe the selected machine hereinafter. The particular machine selected is shown in the accompanying drawings.

Figure 4:
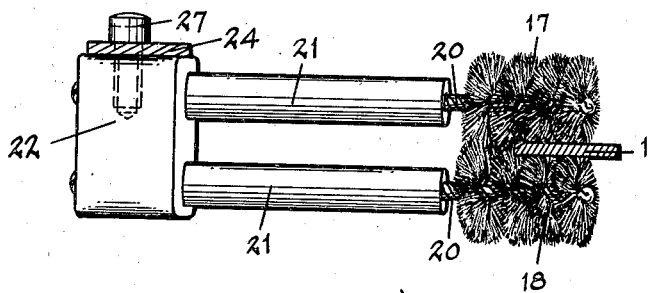
Figure 2:
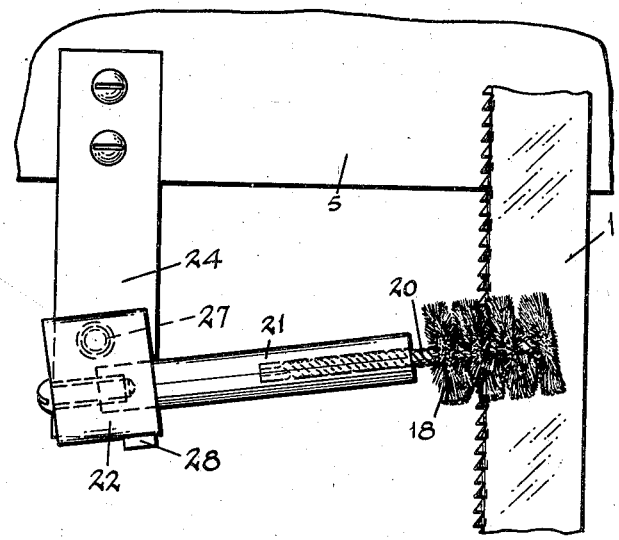
Figure 3:
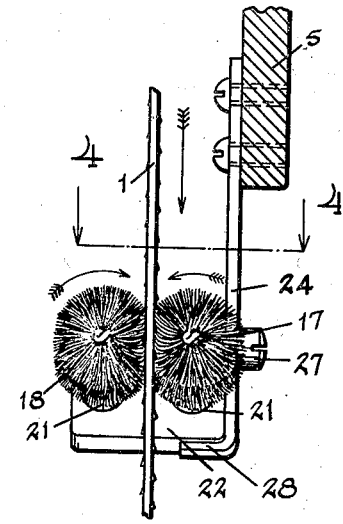

Fig. 1 illustrates a view of a vertical section of parts of a meat sawing machine. Fig. 2 illustrates a side view of the band saw and the means for removing the particles from the teeth of the saw. Fig. 3 illustrates an end view of the parts shown in Fig. 2. Fig. 4 illustrates a view of a section taken on the plane of the line 4—4 indicated in Fig. 3.

This application is a division of my application, Serial No. 66,071, for a Meat cutting and slicing machine, filed February 27, 1936, Patent No. 2,081,033.

In the particular form of construction shown in the drawings, a band saw 1 is rotatably supported and guided by a pair of wheels 2 and 4. The wheel 4 is driven by a suitable motor and drives the band saw and rotates the wheel 2. The wheels and the driving means are supported on a frame comprising the base 5 and the standard 7. The wheel 4 is supported on the base 5, and the wheel 2 is supported in a suitable housing 9 formed on the upper end of the standard 7. During the sawing operation, the meat is located upon the movable table 8 supported on rollers 10. Brackets 11 are connected to the underside of the table, and the rollers 10 are rotatably supported in the brackets. The rollers move in channeled members 12 that are supported on the base 5 and on the brackets 14 connected to the base. The table 8 is provided with the upturned end part 15 for engaging the meat to maintain the meat in position on the plate as it is pushed against the saw 1.

In the form of construction shown in the drawings, the band saw passes between a pair of brushes 17 and 18 supported on the base 5. The brushes 17 and 18 are cylindrical in form and are provided with spindles 20. The spindles 20 are rotatably supported in sleeves 21. The sleeves are connected to a block 22 that is supported on a bracket 24 secured to the base 5. The axes of the spindle 20 and the sleeves 21 are preferably inclined downwardly and away from the cutting edge of the band saw so that as the brushes 17 and 18 are rotated by their engagement with the surfaces of the teeth of the band saw, the spindles will be urged inwardly with respect to the sleeves and thereby prevent ejectment of the spindles during operation of the machine. Preferably the block 22 is pivotally connected to the bracket 24 by means of the stud bolt 27 and the bracket is provided with a lug 28 that engages the underside of the block to support the sleeves in the desired inclined relation with respect to the vertical. When the band saw is to be placed upon the wheels or removed therefrom, the brushes are swung upward, and when the band saw is replaced, the brushes are swung into their inclined position.

The brushes 17 and 18 are located on opposite sides of the saw 1, and the positions of the sleeves 21 that rotatably support the brushes are such that the brushes are pressed against the lateral surfaces of the saw with sufficient pressure to bend the elastic bristles. The pressure of the bristles against the surface of the saw causes the brushes to rotate as the saw is moved. The bristles of the brushes adjacent to the teeth of the saw intermingle and cooperate with each other as the brushes are rotated, to penetrate the spaces between the teeth and to punch the material from the edges of the teeth and the corners formed between the edges. The elasticity of the brushes operates to wipe the corners between adjoining teeth and snap the material outward from the teeth as the bristles move downwardly with the saw in the rotation of the brushes. Preferably, the brushes are formed of spirally or helically arranged rows of bristles and by reason of their inclined axial positions carry the materials outwardly and downwardly from the edges of the teeth, the helical rows of bristles effecting a lateral movement of the material across the face of the saw and the edges of the teeth. Preferably the helical arrangement of the rows of bristles of one brush is opposite to that of the other of the brushes, that is, one will be formed to produce a right hand helix and the other will be formed to produce a left hand helix. The brushes, therefore, being positioned on opposite sides of the band saw 1, and as they are rotated in opposite directions, will produce a similar outwardly inclined brush or sweep of the particles from the saw.

Thus, in the rotation of the brushes, the contiguous bristles that come into engagement with the particles between the teeth are disposed slightly more remote from the base portions of the teeth and progressively wedge the matter away from the corners of the teeth. As the teeth move past the bristles and are leaving the plane of the axis of the oppositely disposed brushes, the bristles are released and elastically snap away from the edges of the teeth and the side surfaces of the saw the material gathered by the saw. This will cause the removal of practically all of the material from the band saw.

I claim:

In a sawing machine, a saw cleaning means comprising a pair of cylindrically formed brushes, means for rotatably supporting the brushes to press bristles of the brushes against the lateral surfaces of the saw and cause penetration of end parts of certain of the bristles between the teeth of the saw and to rotate the brushes by the movement of the saw and to locate the axes of the brushes in a line inclined to the direction of movement of the saw and upwardly toward the toothed edge of the saw, the bristles of the brushes being formed in helical rows to produce a lateral wiping action across the surfaces of the saw in a downward and outward direction from the teeth toward their points as the spirally located ends of the bristles of the brushes advance progressively toward the back edge of the saw to eject material collected between the teeth of the saw during the sawing operation.

CARL G. BIRO.